(12) United States Patent
Spadaccia et al.

(10) Patent No.: US 11,155,500 B2
(45) Date of Patent: Oct. 26, 2021

(54) REFRACTORY ARTICLES AND METHODS FOR FORMING SAME

(71) Applicant: SAINT-GOBAIN CERAMICS & PLASTICS, INC., Worcester, MA (US)

(72) Inventors: Julio Cesar T. Spadaccia, Windermere, FL (US); Nancy F. Levoy, Concord, MA (US); Allan R. Case, Worcester, MA (US); Craig J. Iozzo, Dudley, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 16/683,152

(22) Filed: Nov. 13, 2019

(65) Prior Publication Data

US 2020/0148597 A1      May 14, 2020

Related U.S. Application Data

(60) Provisional application No. 62/760,566, filed on Nov. 13, 2018.

(51) Int. Cl.
*C04B 35/565*      (2006.01)
*C04B 35/14*       (2006.01)
(Continued)

(52) U.S. Cl.
CPC .......... *C04B 35/565* (2013.01); *C04B 35/101* (2013.01); *C04B 35/14* (2013.01);
(Continued)

(58) Field of Classification Search
CPC ..... C04B 35/565; C04B 35/101; C04B 35/14; C04B 35/185; C04B 2201/32; C04B 2235/79; C04B 2235/9607
(Continued)

(56) References Cited

U.S. PATENT DOCUMENTS 4,921,721 A    5/1990   Matsui et al.
5,350,609 A    9/1994   Bouchemousse
(Continued)

FOREIGN PATENT DOCUMENTS

CN    201653149 U    11/2010
EP      2546215 A1    5/2017
JP    H10-238961 A1    9/1998

OTHER PUBLICATIONS

International Search Report from PCT Application No. PCT/US2019/061314 dated Mar. 12, 2020 (2 pages).

*Primary Examiner* — Humera N. Sheikh
*Assistant Examiner* — Katherine A Christy
(74) *Attorney, Agent, or Firm* — Abel Schillinger, LLP; Adrian Lawrence

(57) ABSTRACT

A refractory article includes a body having a first portion defining at least a portion of a first exterior surface of the body, the first portion including a carbide, and further including a second portion defining at least a portion of a second exterior surface of the body opposite the first exterior surface, the second portion including an oxide, and a thermal conductivity difference (ΔTC) of at least 10 W/mK between the first exterior surface and the second exterior surface, and an average Shell Temperature of not greater than 400° C.

16 Claims, 5 Drawing Sheets

(51) Int. Cl.
*C04B 35/185* (2006.01)
*C04B 35/101* (2006.01)

(52) U.S. Cl.
CPC ........ *C04B 35/185* (2013.01); *C04B 2201/32* (2013.01); *C04B 2235/79* (2013.01); *C04B 2235/9607* (2013.01)

(58) Field of Classification Search
USPC ........................................................ 428/698
See application file for complete search history.

(56) References Cited

U.S. PATENT DOCUMENTS

| | | | |
|---|---|---|---|
| 5,391,404 A | 2/1995 | Lee et al. | |
| 6,610,370 B2 | 8/2003 | Wang et al. | |
| 7,993,571 B2 | 8/2011 | Bryden | |
| 8,003,557 B2 | 8/2011 | Levoy et al. | |
| 9,073,791 B2 | 7/2015 | Reilly et al. | |
| 9,315,426 B2 | 4/2016 | Hitchings et al. | |
| 2006/0281625 A1* | 12/2006 | Kinoshita | C04B 35/565 501/92 |
| 2009/0130446 A1* | 5/2009 | Schmidt | C04B 41/5053 428/408 |
| 2011/0024956 A1 | 2/2011 | Jorge et al. | |
| 2013/0026686 A1* | 1/2013 | Tomala | F27B 1/14 266/171 |
| 2019/0219336 A1* | 7/2019 | He | F27B 17/02 |

\* cited by examiner

REFRACTORY ARTICLES AND METHODS FOR FORMING SAME

CROSS-REFERENCE TO RELATED APPLICATION(S)

This application claims priority under 35 U.S.C. § 119(e) to U.S. Provisional Application No. 62/760,566 entitled "REFRACTORY ARTICLES AND METHODS FOR FORMING SAME," by Julio Cesar T. SPADACCIA, filed Nov. 13, 2018, which is assigned to the current assignee hereof and incorporated herein by reference in its entirety.

BACKGROUND

Field of the Disclosure

The present application relates in general to refractory articles, and more specifically refractory articles including a first portion and second portion.

Description of the Related Art

Refractory articles, such as kiln furniture and construction materials are required to perform under harsh conditions. For instance, furnace walls may be constructed from refractory materials, which are ideally made to maintain a particular temperature within the furnace and an exterior side that will be sufficiently cool to reduce or eliminate health and safety concerns. The construction materials are also subject to significant mechanical stresses and may act as load bearing objects. Thus, certain refractory articles must be sufficiently strong to meet the necessary building tolerances. The industry continues to demand improved refractory articles.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

The following is directed towards refractory articles and methods of forming refractory articles. Such refractory articles may be suitable for use in various high temperature applications, including for example kiln furniture and/or construction materials.

Figure 1:
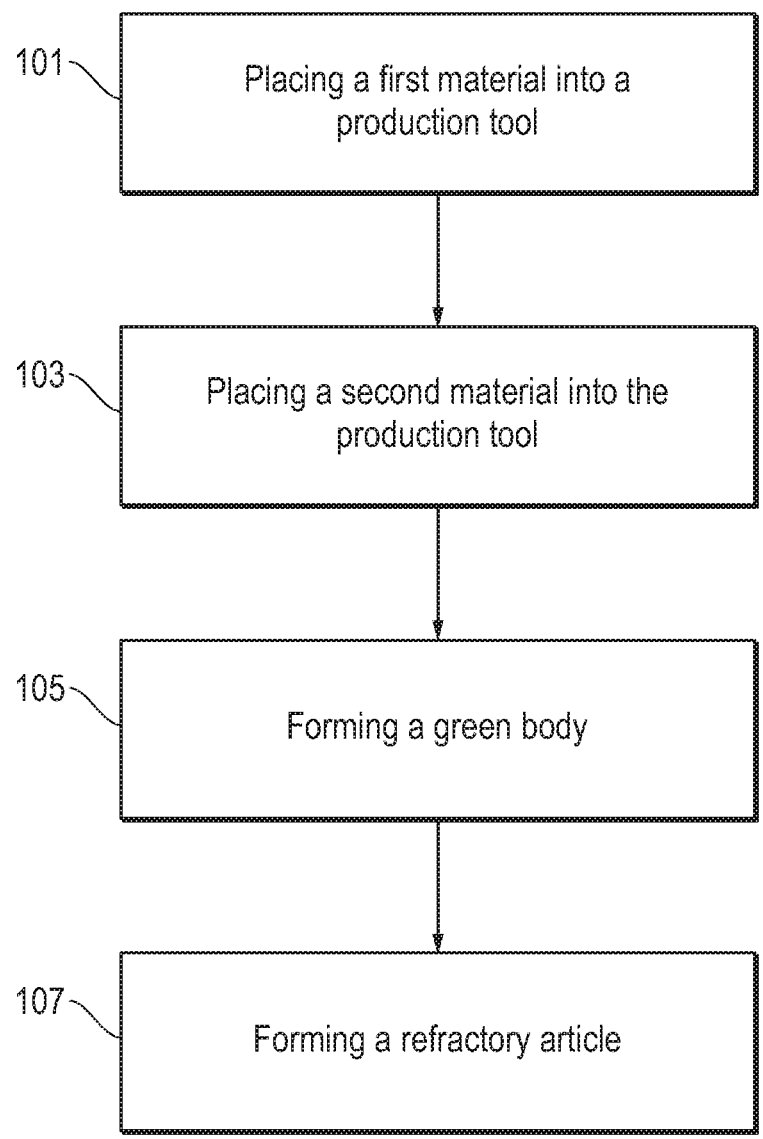
FIG. 1 includes a flowchart including a process for forming a refractory article according to an embodiment FIG. 2A includes a perspective view illustration of a refractory article according to an embodiment.

FIG. 1 includes a flowchart illustrating a process for forming a refractory article according to an embodiment. As illustrated, the process can be started by placing a first material into a production tool at step 101. As illustrated in FIG. 1, the process may be initiated by placing the first material into a production tool at step 101. The process may further include placing a second material into the production tool at step 103. The process may also include forming a green body at step 105. Step 107 can include forming the refractory article.

The first material can be a dry mixture or a wet mixture, wherein a wet mixture includes a least one liquid additive. For example, the first material may include one or more dry powder components combined together. In still another embodiment, the first material may be a wet mixture including solid material contained in a liquid carrier, such as in the form of a slurry. In accordance with an embodiment, the first material may include a ceramic material, such as an oxide, carbide, boride, nitride, or any combination thereof. In particular instances, the first material can include a powder material including a carbide, such as sillicon carbide.

The first material may be placed into a cavity in the production tool. In certain instances, the first material can be placed into the production tool by depositing the first material into a cavity in the production tool, such that the first material forms a layer in a portion of the cavity of the production tool.

The production tool may be an object having a cavity of a desired size and shape to facilitate forming the desired refractory article. For example, the production tool may include a mold. In at least one embodiment, the green body and finally-formed refractory article may be formed in the same production tool. In an alternative embodiment, the production tool may be a vessel or system for forming the green body and/or finally-formed refractory article. For example, the production tool may be an additive manufacturing chamber (e.g., three-dimensional printing chamber), wherein the green body is formed from controlled formation of smaller components. Accordingly, the production tool need not necessarily be limited to mold.

After placing the first material into a production tool, the process can continue at step 103 by placing a second material into the production tool. The second material can include a dry mixture or wet mixture. The second material can be deposited into the same cavity containing the first material. More specifically, the second material can be deposited as a layer overlying the first material. For example, the second material may be overlying and in direct contact with the first material. In at least one embodiment, the process of placing the first and second materials into the production tool can include selectively layering the first material as a first layer and depositing the second material into the same cavity of the production tool as layer in direct contact with and overlying the layer of the first material. It will be appreciated that the order of materials deposited into the cavity can be altered depending upon the forming process.

The second material can include an oxide, carbide, boride, nitride, or any combination thereof. In one particular embodiment, the second material includes an oxide compound, such as alumina, silica, and the like. In certain instances, the second material may include a silicate, such as an aluminosilicate compound. An example of such an aluminosilicate compound can include mullite ($3Al_2O_3$-$2SiO_2$ or $2Al_2O_3$—$SiO_2$). In at least one embodiment, the second material can include a ceramic powder material consisting of mullite.

In certain senses, the process may include depositing a plurality of materials in the production tool in a controlled manner. For example, the process may further include an optional process of placing a third material into the production tool, wherein the third material can be disposed between the first material and the second material. In more particular instances, the third material may be disposed between and abutting both the first material and the second material. Like the first or second material, the third material may be a dry material or wet material, and may have any of the attributes of those materials as described herein.

For those embodiments utilizing a third material, a distinct third portion can be formed in the green body and the finally-formed refractory article. The third portion can be disposed between the first and second portions. Furthermore, it will be appreciated that any processes conducted on the first material and second material are conducted on the third material. It will also be understood that the green body can include any number of distinct portions layered relative to each other.

According to one particular embodiment, the third material can be a mixture of the first material and second material. The relative ratio of the first material and second material can be altered depending upon the intended application. For example, third material can include a mixture of the first material and the second material as a mixture ratio Mr=(M1/M2) of at least 0.1, wherein M1 represents the content (wt %) of the first material in the mixture and M2 represents the content (wt %) of the second material in the mixture. For example, the mixture ratio (Mr) can be at least 0.2, such as at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10. Still, in one non-limiting embodiment, the mixture ratio (Mr) can be not greater than 10, such as not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3. It will be appreciated that the mixture ratio (Mr) can be within a range including any of the minimum and maximum values noted above.

The first and second materials (and any number of other optional materials) can be formed into the green body at step 105. The green body can have a first portion including the first material and a second portion including the second material. Certain suitable processes for forming the green body can include molding, casting, pressing, drying, cooling, heating, irradiating, or any combination thereof. In one particular embodiment, the process of forming the green body can include pressing the combination of the first material and the second material in the production tool to form a green body. Some suitable examples of such processes can include cold pressing, warm pressing, hot pressing, or any combination thereof.

In one embodiment the process of forming the green body and the refractory article can be completed in a single forming process in a single processing vessel (e.g., the production tool). Instead, the finally-formed refractory article may be formed directly from the raw materials deposited in the production tool, such that a free-standing green body may not necessarily be formed and removed from the processing vessel. One example includes an additive manufacturing process that forms the green body and fires the green body in the same processing vessel. Still, it will be understood that other processes may form a free-standing green body that is subject to one or more processes and/or handling prior to the process used to form the finally-formed refractory article.

After forming the green body at step 105, the process can continue at step 107 by forming a refractory article from the green body. The process of forming the refractory article can include firing the green body. In one particular embodiment, forming the refractory article can include firing the green body at a firing temperature of at least at least 1200° C., such as at least 1300° C. at least 1400° C. or even at least 1500° C. In another embodiment, the firing temperature may be not greater than 2000° C., such as not greater than 1900° C. or not greater than 1800° C. or not greater than 1700° C. It will be appreciated that the firing temperature can be within a range between any of the minimum and maximum values noted above, including for example within range of at least 1200° C. to not greater than 2000° C.

The firing process may be conducted in a particular atmosphere. For example, the firing atmosphere may include at least one atmospheric condition from the group of inert, oxidizing, reducing, or nitrogen-rich. In one particular embodiment, the atmospheric condition during firing can be a nitrogen-rich atmosphere, such that at least the majority (i.e., at least 51 vol %) or at least 60 vol % or at least 80 vol % or even at least 99 vol % of the atmosphere is nitrogen. In a particular embodiment, the atmosphere during firing may include a combination of conditions, including for example, a first portion of the firing process conducted in a nitrogen-rich atmosphere and thereafter, a second portion of the firing process can be conducted in an inert or oxidizing atmosphere.

In accordance with an embodiment, the process of forming the refractory article can include co-firing the first portion and second portion of the green body associated with the first material and second material, respectively. In a co-firing process, the first portion and second portion may be bonded to each other through necking and grain growth mechanisms. Still, as described in other embodiments, one or more portions (e.g., a third portion) may be disposed between the first and second portions to facilitate improved formation and performance of the refractory article.

Figure 2A:
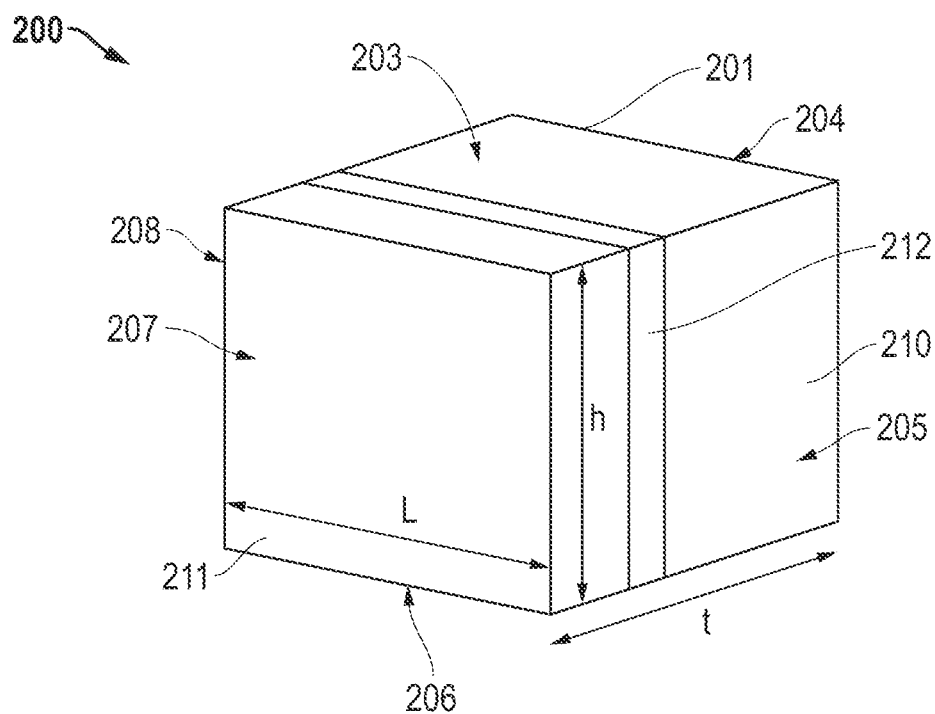
FIG. 2B includes a cross-sectional illustration of a portion of the refractory article of FIG. 2A.

As illustrated in FIG. 2A, the refractory article 200 can have a body 201. The body 201 of FIG. 2A is illustrated as having a cubicle three-dimensional shape, however it will be appreciated that other sizes and shapes that the refractory article may be suitable depending upon the intended application. The body 201 can include surfaces 203, 204, 205, 206, 207, and 208 (203-208) that define the exterior surface of the body 201. As further illustrated, the body 201 may include a first portion 210, a second portion 211, and (optionally) a third portion 212, where the third portion 212 may be disposed between the first portion 210 and the second portion 211. In one embodiment, the first portion 210 can include at least a portion of the exterior surface of the body 201, including for example the entirety of surface 204 and portions of the surfaces 203, 205, 206, 208. In another embodiment, the second portion 211 can include at least a portion of the exterior surface of the body 201, including for example, the surface 207 and portions of the surfaces 203, 205, 206, 208. Notably, the surface 204, which is defined entirely by the first portion 210 can be opposite the surface 207, which is defined entirely by the second portion 211. Such an arrangement may be advantageous for providing the desired thermal characteristics at opposite sides of the body 201. In certain instances, the exterior surface 204 may be referred to as the first exterior surface of the body 201 and the exterior surface 207 may be referred to as the second exterior surface of the body.

As further illustrated, the body 201 can include a length (l), a thickness (t) and a height (h). The thickness typically extends in a direction transverse to the portions, such that the smallest dimension of the portions 210, 211, and 212 can be defined by their thickness, as provided in FIG. 2B. Reference to the length (l), the height (h) or the thickness (t) of the body 201 will be understood to reference the average length (l), average height (h) or average thickness (t) of the body 201. Generally, the length is greater than or equal to the height and the height is greater than or equal to the thickness.

The first portion 210 can have a first average thickness ($T_1$). The second portion 211 may include a second average thickness ($T_2$). And furthermore, the third portion 212 may have a third average thickness ($T_3$). The average thickness of each portion can be evaluate from a suitable cross-section of the body such that a suitable number of randomly selected measurements can be made and averaged. The embodiment of FIG. 2B demonstrates that the body is created such that the portions 210, 211, and 212 vary in the direction of the thickness of the body 201. It will be understood that alternative bodies can be formed such that the portions vary in the direction of the length or width of the body. For example, referring briefly to FIG. 4, the body 401 has varying portion extending in the direction of the length 480. The dimensions of width 481 and thickness 482 do not define directions that extend through all of the portion 410, 411, and 412 of the body 401.

In accordance with an embodiment, at least a portion of the exterior surfaces of the body 201 may be defined by the first portion 210. For example, the first portion 210 may define not greater than 90% of the total exterior surface area of the body 201, such as not greater than 80% or not greater than 70% or not greater than 60% or not greater than 50% or not greater than 40% or not greater than 30% or not greater than 20% or not greater than 10%. Still, in one non-limiting embodiment, the first portion 210 can define and account for at least 1% of the total exterior surface area of the body 201, such as at least at least 5% or at least 10% or at least 20% or at least 30% or at least 40% or at least 50% or at least 60% or at least 70% or at least 80%. It will be appreciated that the first portion 210 can define a percentage of the total exterior surface area of the body 201 within range including any of the minimum and maximum percentages noted above.

Furthermore, at least a portion of the first exterior surface 204 may be defined by the first portion 210. For example, at least 50% of the first exterior surface 204 may be defined by the first portion 210, such as at least 60% or at least 70% or at least 80% or at least 90% or at least 99%. In one particular embodiment, essentially all of the first exterior surface 204 can be defined by the first portion 210. The first exterior surface 204 may be associated with the hot surface of the refractory article, which may be closest to a high temperature environment (e.g., the interior wall of a furnace). In one particular embodiment, the first portion may be spaced apart entirely from the second exterior surface 207 of the body 201, such that the second exterior surface may be free of the first portion and first material.

In accordance with an embodiment, the first portion 210 can include a carbide. For example, the first portion 210 may include silicon carbide. In another embodiment, the first portion 210 may include at least one material from the group of oxygen, nitrogen, compounds (e.g., oxides or nitrides) or any combination thereof. In more particular instances, the first portion 210 may include a multi-phase material including a primary phase including silicon carbide and a secondary phase comprising oxygen, nitrogen, compounds thereof or any combination thereof. The primary phase may be present in a greater content (vol %) compared to the secondary phase. In a particular embodiment, the first portion 210 can comprise nitride-bonded silicon carbide, and more specifically, may consist essentially of nitride-bonded silicon carbide. In another embodiment, the first portion 210 may include an oxynitride-bonded silicon carbide, and more particularly, the first portion 210 may consist essentially of oxynitride-bonded silicon carbide. In yet another embodiment, the first portion 210 may consist essentially of silicon carbide.

In accordance with an embodiment, the first portion 210 can include a certain content of polycrystalline oxide material that may facilitate improved performance of the refractory article. For example, the first portion 210 may include a majority content (at least 51 vol %) of polycrystalline material. For example, the first portion 210 can include at least 60 vol % of polycrystalline material for a total volume of the first portion 210 or at least 70 vol % or at least 80 vol % or at least 90 vol % or at least 95 vol % of a polycrystalline material for a total volume of the first portion 210. In one by embodiment, the first portion 210 can consist essentially of a polycrystalline material. Still, in at least one non-limiting embodiment, the first portion 210 can include not greater than 99 vol % percent polycrystalline material, such as not greater than 95 vol % or not greater than 90 vol % or not greater than 85 vol %. It will be appreciated, that the first portion 210 can have a content of polycrystalline material within a range including any of the minimum and maximum percentages noted above.

For those embodiment having a first portion 210 including a multi-phase material including at least a primary phase and a secondary phase, such material may have a particular content of the primary phase to the secondary phase that may facilitate improved performance of the refractory article. For example, the first portion 210 may have a content ratio, Cr1=(SC2/PC1), of at least 0.1, wherein PC1 is the content (vol %) of the primary phase and SC2 is the content (vol %) of the secondary phase. In other instances, the content ratio of the first portion (Cr1) can be at least 0.001 or at least 0.01 or at least 0.1 or at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10. In another non-limiting embodiment, the first portion 210 may have a content ratio of not greater than 1000, such as not greater than 100 or not greater than 10 or not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0. It will be appreciated that the content ratio (Cr) can be within a range including any of the minimum and maximum values noted above.

In accordance with another embodiment, the first portion 210 can have a particular average thermal conductivity that may facilitate improved performance of the refractory article. For example, the first portion 20 can have an average thermal conductivity of at least 10 W/mK at 1200° C., such as at least 11 W/mK or at least 12 W/mK or at least 13 W/mK or at least 14 W/mK or at least 15 W/mK or at least 16 W/mK or at least 17 W/mK or at least 18 W/mK. In still another embodiment, the first portion 210 can have an average thermal conductivity of not greater than 30 W/mK or not greater than 28 W/mK or not greater than 26 W/mK or not greater than 24 W/mK or not greater than 22 W/mK or not greater than 20 W/mK or not greater than 18 W/mK or not greater than 16 W/mK. It will be appreciated that the first portion 210 can have an average thermal conductivity within a range including any of the minimum and maximum values noted above, including for example within range of at least 10 W/mK and not greater than 30 W/mK. The average thermal conductivity is measured according to ASTM E1461 (Thermal Diffusivity by the Flash Method).

In still another embodiment, the first portion 210 can include a material having a particular average crystallite size that may facilitate improved performance. For example, the first portion 210 may have a primary phase including polycrystalline material having an average crystallite size of at least 1 micron, such as at least 10 microns or at least 25 microns or at least 50 microns or at least 100 microns or at least 250 microns or at least 500 microns or at least 1 mm or at least 2 mm or at least 3 mm or at least 4 mm or at least 5 mm or at least 6 mm or at least 7 mm or at least 8 mm or at least 9 mm. In another non-limiting embodiment, the first portion 210 may have a primary phase including a polycrystalline material (e.g., silicon carbide) having an average crystallite size of not greater than 10 mm, such as not greater than 9 mm or not greater than 8 mm or not greater than 7 mm or not greater than 6 mm or not greater than 5 mm or not greater than 4 mm or not greater than 3 mm or not greater than 2 mm or not greater than 1 mm or not greater than 800 microns or not greater than 500 microns or not greater than 200 microns or not greater than 100 microns or not greater than 50 microns. It will be appreciated that the first portion 210 may include a primary phase comprising silicon carbide having average crystallite size within a range including any of the minimum and maximum values noted above, such as within a range of at least 1 micron to not greater than 10 mm. The average crystallite size can be measured according to the uncorrected intercept method.

Reference herein to average crystallite size may also be referred to as average domain size or average grain size, wherein the domain, crystallite or grain refers to a monocrystalline region defined by a grain boundary and typically abutting or connecting another adjacent crystallite, grain, or domain.

Figure 2B:
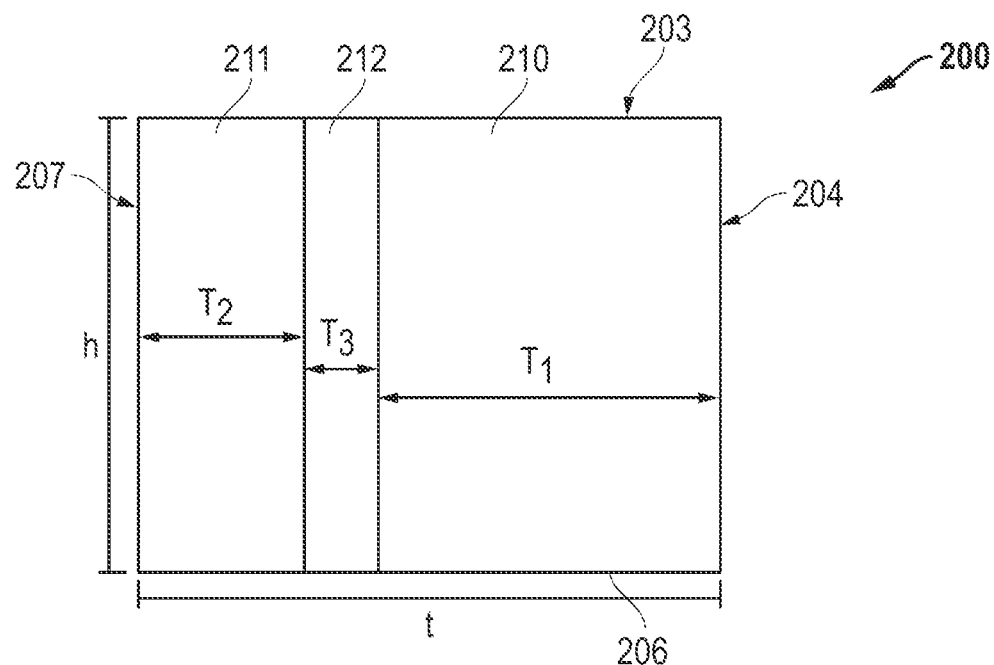

The first portion 210 can have an average thickness that may facilitate improved performance of the refractory article. For example, the first portion 210 can have an average thickness ($T_1$) of at least 10% of the total thickness (t) of the body 201, such as at least 20% or at least 30% or at least 40% or at least 50% or at least 60% or at least 70% or at least 80% of a total thickness (t) of the body 201. In still another embodiment, the average thickness ($T_1$) of the first portion 210 can be not greater than 90% of a total thickness (t) of the body 201, such as not greater than 80% or not greater than 70% or not greater than 60% or not greater than 50% or not greater than 40% or not greater than 30% or not greater than 20% of a total thickness (t) of the body 201. It will be appreciated that the average thickness ($T_1$) of the first portion 210 can be within a range including any of the minimum and maximum percentages noted above. A suitable process for evaluating the average thickness ($T_1$) of the first portion 210 can include sectioning the body 201 to obtain a cross-sectional portion as illustrated in FIG. 2B and measuring the thickness of the first portion 210 in at least three randomly-selected regions.

Furthermore, it will be understood, that for those embodiments where the portions vary in the dimension of length (e.g., embodiment of FIG. 4) or the dimension of width, the same relative relationship between the dimension of the first portion to the dimension of the body can exist. For example, in certain instances, the refractory article may be formed such that the portions vary in the direction of the length of the body. The first portion 210 may have an average length that is at least 10% of the total length of the body, such as such as at least 20% or at least 30% or at least 40% or at least 50% or at least 60% or at least 70% or at least 80% of a total length (l) of the body. Furthermore, for such embodiments, the average length of the first portion can be not greater than 90% of a total length of the body 201, such as not greater than 80% or not greater than 70% or not greater than 60% or not greater than 50% or not greater than 40% or not greater than 30% or not greater than 20% of a total length (l) of the body. It will be appreciated that the average length of the first portion can be within a range including any of the minimum and maximum percentages noted above. The same may apply for the average length of the second and third portions relative to the total length of the body.

It will also be understood that in certain embodiments, the portions may vary in the dimension of width of the body. In such cases, the average width of the first portion may be at least 10% of the total width of the body, such as such as at least 20% or at least 30% or at least 40% or at least 50% or at least 60% or at least 70% or at least 80% of a total width (w) of the body. Furthermore, for such embodiments, the average width of the first portion can be not greater than 90% of a total width of the body 201, such as not greater than 80% or not greater than 70% or not greater than 60% or not greater than 50% or not greater than 40% or not greater than 30% or not greater than 20% of a total width (w) of the body. It will be appreciated that the average width of the first portion can be within a range including any of the minimum and maximum percentages noted above. The same may apply for the average width of the second and third portions relative to the total width (w) of the body.

In another embodiment, the average thickness ($T_1$) of the first portion 210 can be at least 1 mm or at least 5 mm or at least 10 mm or at least 25 mm or at least 50 mm or at least 100 mm or at least 200 mm or at least 500 mm. In another embodiment, the average thickness (T1) of the first portion 210 can be not greater than 10 m, such as not greater than 5 m or not greater than 3 m or not greater than 1 m or not greater than 800 mm or not greater than 500 mm or not greater than 200 mm or not greater than 100 mm. It will be appreciated that the average thickness of the first portion 210 can be within a range including any of the minimum and maximum values noted above.

In accordance with another embodiment, the second portion 211 may include a certain material that facilitates improved performance of the refractory article. For example, the second portion 211 can include an oxide-containing compound, including for example, alumina ($Al_2O_3$), silica ($SiO_2$), or any combination thereof. In a more particular embodiment, the second portion can include an aluminosilicate, such as mullite ($3Al_2O_3 \cdot 2SiO_2$ or $2Al_2O_3$—$SiO_2$). In at least one embodiment, the second portion 211 consists essentially of mullite ($3Al_2O_3 \cdot 2SiO_2$ or $2Al_2O_3$—$SiO_2$).

In accordance with an embodiment, the second portion 211 can include a certain content of polycrystalline oxide material that may facilitate improved performance of the refractory article. For example, the second portion 211 may include a majority content (at least 51 vol %) of polycrystalline oxide material. For example, the second portion can include at least 60 vol % of a polycrystalline oxide material for a total volume of the second portion or at least 70 vol % or at least 80 vol % or at least 90 vol % or at least 95 vol % of a polycrystalline oxide material for a total volume of the second portion. In one by embodiment, the second portion can consist essentially of a polycrystalline oxide material. Still, in at least one non-limiting embodiment, the second portion 211 can include not greater than 99 vol % percent polycrystalline material, such as not greater than 95 vol % or not greater than 90 vol % or not greater than 85 vol %. It will be appreciated, that the second portion 211 can have a content of polycrystalline material within a range including any of the minimum and maximum percentages noted above.

In a more particular embodiment, the second portion may include a majority content (at least 50 vol %) of polycrystalline mullite for a total volume of the second portion 211. In other instances, the percentage of polycrystalline mullite in the second portion 211 can be greater, such as at least 60 vol % of a polycrystalline mullite for a total volume of the second portion or at least 70 vol % or at least 80 vol % or at least 90 vol % or at least 95 vol % of a polycrystalline mullite for a total volume of the second portion. In at least one embodiment, the second portion 211 can consist essentially of polycrystalline mullite. In still another embodiment, the second portion 211 can be essentially free of amorphous phase material.

The second portion 211 may have a polycrystalline phase having a particular average crystallite size (i.e., grain size) that may facilitate improved performance. For example, the second portion 211 may include a polycrystalline material having an average crystallite size of at least 1 micron, such as at least 10 microns or at least 25 microns or at least 50 microns or at least 100 microns or at least 250 microns or at least 500 microns or at least 1 mm or at least 2 mm or at least 3 mm or at least 4 mm or at least 5 mm or at least 6 mm or at least 7 mm or at least 8 mm or at least 9 mm. In another non-limiting embodiment, the second portion 211 may have a polycrystalline phase (e.g., mullite) having an average crystallite size of not greater than 10 mm, such as not greater than 9 mm or not greater than 8 mm or not greater than 7 mm or not greater than 6 mm or not greater than 5 mm or not greater than 4 mm or not greater than 3 mm or not greater than 2 mm or not greater than 1 mm or not greater than 800 microns or not greater than 500 microns or not greater than 200 microns or not greater than 100 microns or not greater than 50 microns. It will be appreciated that the second portion 211 may include a polycrystalline phase having an average crystallite size within a range including any of the minimum and maximum values noted above, such as within a range of at least 1 micron to not greater than 10 mm. The average crystallite size can be measured according to the uncorrected intercept method.

In another aspect, the second portion 211 of the body 201 can define a certain percentage of the total exterior surface area of the body 201 that may facilitate improved performance of the refractory article. For example, the second portion 211 may define not greater than 90% of the total exterior surface area of the body 201, such as not greater than 80% or not greater than 70% or not greater than 60% or not greater than 50% or not greater than 40% or not greater than 30% or not greater than 20% or not greater than 15% or not greater than 10% or not greater than 8% or not greater than 5% or not greater than 3%. Still, another non-limiting embodiment, the second portion 211 can define at least 1% of the total exterior surface area of the body 201, such as at least 2% or at least 3% or at least 5% or at least 8% or at least 10% or at least 12% or at least 15% or at least 20% or at least 25% or at least 30% or at least 40% or at least 50% or at least 60%. It will be appreciated that the second portion 211 can define a percentage of the total exterior surface area of the body 201 within range including any of the minimum and maximum percentages noted above.

Furthermore, at least a portion of the second exterior surface 207 may be defined by the second portion 211. For example, at least 50% of the second exterior surface 207 may be defined by the second portion 211, such as at least 60% or at least 70% or at least 80% or at least 90% or at least 99%. In one particular embodiment, essentially all of the second exterior surface 207 can be defined by the second portion 211. The second exterior surface 207 may be associated with a cool surface of the refractory article, which may be furthest from a high temperature environment (e.g., the exterior wall of a furnace). At least a portion of the second exterior surface 207 of the body 201 can be opposite the first exterior surface 204. Furthermore, the second portion 211 may be spaced apart entirely from the first exterior surface 204 of the body 201, such that the first exterior surface 204 may be free of the second portion 211 and second material.

In accordance with another embodiment, the second portion 211 can have a particular average thermal conductivity that may facilitate improved performance of the refractory article. For example, the second portion 211 can have an average thermal conductivity of not greater than 10 W/mK, such as not greater than 8 W/mK or not greater than 7 W/mK or not greater than 6 W/mK or not greater than 5 W/mK or not greater than 4 W/mK or not greater than 2 W/mK or not greater than 1 W/mK. In still another embodiment, the second portion 211 can have an average thermal conductivity of at least 0.5 W/mK or at least 1 W/mK or at least 2 W/mK or at least 3 W/mK or at least 4 W/mK or at least 5 W/mK or at least 6 W/mK or at least 7 W/mK or at least 8 W/mK. It will be appreciated that the second portion 211 can have an average thermal conductivity within a range including any of the minimum and maximum values noted above, including for example within range of at least 0.5 W/mK and not greater than 10 W/mK. The average thermal conductivity is measured according to ASTM E1461.

In at least one embodiment, the refractory article 200 can have a body 201 that may have a certain thermal conductivity difference between the first portion 210 and the second portion 211 that may facilitate improved performance. For example, the body 201 can have a thermal conductivity difference $\Delta TC = TC1 - TC2$ of not greater than 200 W/mK, wherein TC1 is the average thermal conductivity of the first portion 210 and TC2 is the average thermal conductivity of the second portion 211. In other instances, the thermal conductivity difference $\Delta TC$ can be not greater than 180 W/mK or not greater than 160 W/mK or not greater than 140 W/mK or not greater than 120 W/mK or not greater than 100 W/mK or not greater than 90 W/mK or not greater than 80 W/mK or not greater than 70 W/mK or not greater than 60 W/mK or not greater than 50 W/mK or not greater than 45 W/mK or not greater than 40 W/mK or not greater than 35 W/mK or not greater than 30 W/mK or not greater than 25 W/mK or not greater than 22 W/mK or not greater than 20 W/mK. In yet another embodiment, the thermal conductivity difference ($\Delta TC$) can be at least 10 W/mK, such as at least 13 W/mK or at least 14 W/mK or at least 15 W/mK or at least 16 W/mK or at least 17 W/mK or at least 18 W/mK or at least 20 W/mK or at least 25 W/mK or at least 30 W/mK or at least 35 W/mK or at least 40 W/mK or at least 45 W/mK or at least 50 W/mK or at least 55 W/mK or at least 60 W/mK or at least 70 W/mK or at least 80 W/mK or at least 90 W/mK or at least 100 W/mK. It will be appreciated that the refractory article can have a thermal conductivity difference within a range including any of the minimum and maximum values noted above. The thermal conductivity difference can be measured at the surface of the first and second exterior surfaces 204 and 207, and thus may also be considered the thermal conductivity difference between the first exterior surface 204 and the second exterior surface 207.

In yet another embodiment, the refractory article may have a particular coefficient of thermal expansion difference between the first portion 210 and the second portion 210 that may facilitate an improvement in the performance of the refractory article. For example, the body 201 may have an coefficient of thermal expansion difference ($\Delta CTE = CTE1 - CTE2$) of not greater than 5 $10^{-6}/°$ C., wherein CTE1 is the average coefficient of thermal expansion of the first portion and CTE2 is the average coefficient of thermal expansion of the second portion 211. In other instances the coefficient of thermal expansion difference ($\Delta CTE$) can be not greater than $4.8 \times 10^{-6}/°$ C. or not greater than $4.6 \times 10^{-6}/°$ C. or not greater than $4.4 \times 10^{-6}/°$ C. or not greater than $4.2 \times 10^{-6}/°$ C. or not greater than $4 \times 10^{-6}/°$ C. or not greater than 3.8 s $10^{-6}/°$ C. or not greater than $3.6 \times 10^{-6}/°$ C. or not greater than $3.4 \times 10^{-6}/°$ C. or not greater than $3.2 \times 10^{-6}/°$ C. or not greater than $3 \times 10^{-6}/°$ C. or not greater than $2.9 \times 10^{-6}/°$ C. or not greater than $2.8 \times 10^{-6}/°$ C. or not greater than $2.7 \times 10^{-6}/°$ C. or not greater than $2.6 \times 10^{-6}/°$ C. or not greater than $2.5 \times 10^{-6}/°$ C. or not greater than $2.4 \times 10^{-6}/°$ C. or not greater than $2.3 \times 10^{-6}/°$ C. or not greater than $2.2 \times 10^{-6}/°$ C. or not greater than $2.1 \times 10^{-6}/°$ C. or not greater than $2 \times 10^{-6}/°$ C. or not greater than $1.9 \times 10^{-6}/°$ C. or not greater than $1.8 \times 10^{-6}/°$ C. or not greater than $1.7 \times 10^{-6}/°$ C. or not greater than $1.6 \times 10^{-6}/°$ C. or not greater than $1.5 \times 10^{-6}/°$ C. or not greater than $1.4 \times 10^{-6}/°$ C. or not greater than $1.3 \times 10^{-6}/°$ C. or not greater than $1.2 \times 10^{-6}/°$ C. or not greater than $1.1 \times 10^{-6}/°$ C. or not greater than $1 \times 10^{-6}/°$ C. or not greater than $0.9 \times 10^{-6}/°$ C. or not greater than $0.8 \times 10^{-6}/°$ C. or not greater than $0.7 \times 10^{-6}/°$ C. or not greater than $0.6 \times 10^{-6}/°$ C. or not greater than $0.5 \times 10^{-6}/°$ C. or not greater than $0.4 \times 10^{-6}/°$ C. or not greater than $0.3 \times 10^{-6}/°$ C. or not greater than $0.2 \times 10^{-6}/°$ C. or not greater than $0.1 \times 10^{-6}/°$ C. The CTE is measured according to ASTM C832 (Standard Test Method of Measuring Thermal Expansion and Creep of Refractories Under Load, which will be referred to herein as the "Coefficient of Thermal Expansion" and is a valid value up to 1500° C.). In another embodiment, coefficient of thermal expansion difference ($\Delta CTE$) can be at least $0.001 \times 10^{-6}/°$ C. or at least $0.01 \times 10^{-6}/°$ C. or at least $0.1 \times 10^{-6}/°$ or at least $0.5 \times 10^{-6}/°$ C. or at least $1 \times 10^{-6}/°$ C. It will be appreciated that the coefficient of thermal expansion difference may be within a range including any of the minimum and maximum values noted above.

The refractory article may be formed such that the second portion 211 has a particular average thickness ($T_2$) relative to the total thickness (t) of the body 201. For example, the second portion 211 can have an average thickness ($T_2$) of at least 5% of the total thickness of the body 201, such as at least 6% or at least 7% or at least 8% or at least 9% or at least 10% or at least 15% or at least 20% or at least 25% or at least 30% or at least 35% or at least 40% or at least 50% or at least 55% or at least 60% of a total thickness (t) of the body 201. Still, in at least one non-limiting embodiment, the second portion 211 can have an average thickness of not greater than 90% of a total thickness (t) of the body 201, such as not greater than 80% or not greater than 70% or not greater than 60% or not greater than 50% or not greater than 40% or not greater than 30% or not greater than 20% or not greater than 10% of a total thickness (t) of the body 201. It will be appreciated that the average thickness of the second portion 211 relative to the total thickness (t) of the body 201 can be within a range including any of the minimum and maximum values noted above.

As noted above with respect to the first portion 210, alternative embodiments can have the portions varying with respect to the length or width of the body. In such instances, the relative average length to the total length of the body can have the same percentages as noted above for the relative average thickness of the second portion to the total thickness of the body. For example, in embodiments where the portions vary along the dimension of length, the relative average length of the second portion can be at least 5% of the total length of the body, such as at least 6% or at least 7% or at least 8% or at least 9% or at least 10% or at least 15% or at least 20% or at least 25% or at least 30% or at least 35% or at least 40% or at least 50% or at least 55% or at least 60% of a total length (l) of the body. Still, in at least one non-limiting embodiment, the second portion can have an average length of not greater than 90% of a total length (l) of the body, such as not greater than 80% or not greater than 70% or not greater than 60% or not greater than 50% or not greater than 40% or not greater than 30% or not greater than 20% or not greater than 10% of a total length (l) of the body. It will be appreciated that the average length of the second portion relative to the total length (l) of the body can be within a range including any of the minimum and maximum values noted above.

In another aspect, the body can have portions that vary along the dimension of width. In such embodiments, the relative average width of the second portion can be at least 5% of the total width (w) of the body, such as at least 6% or at least 7% or at least 8% or at least 9% or at least 10% or at least 15% or at least 20% or at least 25% or at least 30% or at least 35% or at least 40% or at least 50% or at least 55% or at least 60% of a total length (l) of the body. Still, the second portion can have an average width of not greater than 90% of a total width (w) of the body, such as not greater than 80% or not greater than 70% or not greater than 60% or not greater than 50% or not greater than 40% or not greater than 30% or not greater than 20% or not greater than 10% of a total width (w) of the body. It will be appreciated that the average width of the second portion relative to the total width (w) of the body can be within a range including any of the minimum and maximum values noted above.

In at least one aspect, controlling the relative average thickness ($T_1$) of the first portion 210 to the average thickness ($T_2$) of the second portion 211 may facilitate the formation of an improved factory article. For example, the first portion 210 may have a first average thickness ($T_1$) and the second portion 211 may have a second average thickness ($T_2$) and the body 201 can have a thickness ratio, $Tr=(T_1/T_2)$, that is at least 0.1, such as at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10. Still, at least one non-limiting embodiment, the thickness ratio, $Tr=(T_1/T_2)$, may be not greater than 10, such as not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3. It will be appreciated that the thickness ratio can be within a range including any of the minimum and maximum values noted above.

It will be understood that the foregoing ratios apply equally to those embodiments having portions that vary in the direction of length of width. For example, for those embodiments where the body has portions varying along the length of the body, the first portion can have an average length ($L_1$) and the second portion can have an average length ($L_2$) and the portions can have a length ratio, $Lr=(L_1/L_2)$, that is at least 0.1, such as at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10. Still, at least one non-limiting embodiment, the length ratio, $Lr=(L_1/L_2)$, may be not greater than 10, such as not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3. It will be appreciated that the length ratio can be within a range including any of the minimum and maximum values noted above.

For those embodiments where the body has portions varying in the direction of the width of the body, the first portion can have an average width ($W_1$) and the second portion can have an average width ($W_2$) and the portions can have a width ratio, $Wr=(W_1/W_2)$, that is at least 0.1, such as at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10. Still, at least one non-limiting embodiment, the width ratio, $Wr=(W_1/W_2)$, may be not greater than 10, such as not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3. It will be appreciated that the width ratio can be within a range including any of the minimum and maximum values noted above.

The second portion may have a certain average thickness ($T_2$) that may facilitate an improved refractory article. For example, second portion 211 may have an average thickness ($T_2$) at least 1 mm, such as at least 5 mm or at least 10 mm or at least 25 mm or at least 50 mm or at least 100 mm or at least 200 mm or at least 500 mm. In another embodiment, the average thickness ($T_2$) of the second portion 211 can be not greater than 3 m, such as not greater than 2 m or not greater than 1 m or not greater than 800 mm or not greater than 500 mm or not greater than 200 mm or not greater than 100 mm. It will be appreciated that the average thickness ($T_2$) of the second portion 211 can be within a range including any of the minimum and maximum values noted above.

As noted herein, the body 201 may include a third portion 212. In certain instances, the third portion 212 may be disposed between the first portion 210 second portion 211, and more particularly, may be abutting and in direct contact with the first portion 210 and second portion 211.

In one aspect, the third portion 212 can include at least one of an oxide and a carbide. For example, third portion 212 may include a combination of materials, including an oxide and a carbide. In another embodiment, third portion 212 can include at least a first phase comprising a material from a group of silicon carbide (SiC), silicon nitride ($Si_3N_4$), silicon oxynitride ($Si_2ON_2$), silica ($SiO_2$), mullite ($3Al_2O_3$-$2SiO_2$ or $2Al_2O_3$—$SiO_2$), alumina, ($Al_2O_3$), silicon aluminum oxynitride (SiAlON), or any combination thereof. In more particular embodiments, the third portion 212 may include a first phase comprising nitride-bonded silicon carbide and a second phase comprising mullite ($3Al_2O_3$-$2SiO_2$ or $2Al_2O_3$—$SiO_2$).

The third portion 212 may have a particular ratio of the first phase to the second phase as defined by a content ratio that may facilitate improved performance of the refractory article. For example, the third portion 212 may have a content ratio, $Cr=(C1/C2)$ of at least 0.1, wherein C1 represents the content (vol %) of the first phase and C2 represents the content (vol %) of the second phase, such as at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10. In another embodiment, the content ratio $Cr=(C1/C2)$ may be not greater than 10, such as not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3. It will be appreciated that the content ratio of the third portion 212 can be within a range including any of the minimum and maximum values noted above.

The third portion 212 have a particular average thermal conductivity for improved performance of the refractory article. For example, third portion 212 may have an average thermal conductivity of not greater than 50 W/mK, such as not greater than 45 W/mK or not greater than 40 W/mK or not greater than 30 W/mK or not greater than 25 W/mK or not greater than 20 W/mK or not greater than 18 W/mK or not greater than 15 W/mK. In still one non-limiting embodiment, the average thermal conductivity of the third portion 212 may be at least 1 W/mK, such as at least 2 W/mK or at least 3 W/mK or at least 4 W/mK or at least 5 W/mK or at least 6 W/mK or at least 7 W/mK or at least 8 W/mK or at least 10 W/mK or at least 12 W/mK or at least 14 W/mK or at least 16 W/mK or at least 18 W/mK or at least 20 W/mK or at least 25 W/mK. It will be appreciated that the average thermal conductivity of the third portion 212 can be within range including any of the minimum and maximum values noted above. Thermal conductivity of the third portion can be measured according to ASTM E1461.

In certain instances, third portion 212 may include a specific composition and microstructure. The third portion 212 may include a first phase comprising silicon carbide and having an average crystallite size (i.e., grain size) that may facilitate improved performance. For example, the third portion 211 may include a polycrystalline first phase having an average crystallite size of at least 1 micron, such as at least 10 microns or at least 25 microns or at least 50 microns or at least 100 microns or at least 250 microns or at least 500 microns or at least 1 mm or at least 2 mm or at least 3 mm or at least 4 mm or at least 5 mm or at least 6 mm or at least 7 mm or at least 8 mm or at least 9 mm. In another non-limiting embodiment, the first phase of the third portion 212 may have an average crystallite size of not greater than 10 mm, such as not greater than 9 mm or not greater than 8 mm or not greater than 7 mm or not greater than 6 mm or not greater than 5 mm or not greater than 4 mm or not greater than 3 mm or not greater than 2 mm or not greater than 1 mm or not greater than 800 microns or not greater than 500 microns or not greater than 200 microns or not greater than 100 microns or not greater than 50 microns. It will be appreciated that the third portion 212 may include a polycrystalline first phase having an average crystallite size within a range including any of the minimum and maximum values noted above, such as within a range of at least 1 micron to not greater than 10 mm. The average crystallite size can be measured according to the uncorrected intercept method.

In another embodiment, the third portion 212 may have a second phase comprising an oxide material having an average crystallite size (i.e., grain size) that may facilitate improved performance. For example, the third portion 211 may include a polycrystalline second phase having an average crystallite size of at least 1 micron, such as at least 10 microns or at least 25 microns or at least 50 microns or at least 100 microns or at least 250 microns or at least 500 microns or at least 1 mm or at least 2 mm or at least 3 mm or at least 4 mm or at least 5 mm or at least 6 mm or at least 7 mm or at least 8 mm or at least 9 mm. In another non-limiting embodiment, the second phase of the third portion 212 may have an average crystallite size of not greater than 10 mm, such as not greater than 9 mm or not greater than 8 mm or not greater than 7 mm or not greater than 6 mm or not greater than 5 mm or not greater than 4 mm or not greater than 3 mm or not greater than 2 mm or not greater than 1 mm or not greater than 800 microns or not greater than 500 microns or not greater than 200 microns or not greater than 100 microns or not greater than 50 microns. It will be appreciated that the third portion 212 may include a polycrystalline second phase having an average crystallite size within a range including any of the minimum and maximum values noted above, such as within a range of at least 1 micron to not greater than 10 mm. The average crystallite size can be measured according to the uncorrected intercept method.

In still another aspect, third portion 212 may have an average thickness ($T_3$) that facilitates improved performance of the refractory article. For example, the third portion 212 may have an average thickness of at least 1% of a total thickness (t) of the body 201, such as at least 5% or at least 10% or at least 20% or at least 30% or at least 40% or at least 50% of a total thickness (t) of the body 201. In another embodiment, the third portion 212 may have an average thickness ($T_3$) of not greater than 90% of a total thickness (t) of the body 201, such as not greater than 80% or not greater than 70% or not greater than 60% or not greater than 50% or not greater than 40% or not greater than 30% or not greater than 20% or not greater than 10% or not greater than 5% of a total thickness (t) of the body 201. It will be appreciated that the average thickness ($T_3$) of the third portion 212 can be within a range including any of the minimum and maximum values noted above. As noted herein, for those embodiments having portions that vary in the direction of the length, the relative average length of the third portion to the total length of the body can be the same as noted above for the thickness. Moreover, for those embodiments having portions that vary in the direction of the width, the relative average width of the third portion to the total width of the body can be the same as noted above for the thickness.

In another aspect, the third portion 212 may have a certain average thickness that may facilitate improved performance of the refractory article. For example, third portion may have an average thickness of not greater than 1 m, such as not greater than 800 mm or not greater than 500 mm or not greater than 200 mm or not greater than 100 mm or not greater than 50 mm or not greater than 20 mm or not greater than 10 mm or not greater than 1 mm or not greater than 500 microns or not greater than 100 microns. In another non-limiting embodiment, the third portion 212 may have an average thickness ($T_3$) of at least 1 micron, such as at least 10 microns or at least 20 microns or at least 30 microns or at least 50 microns or at least 100 microns or at least 200 microns or at least 500 microns or at least 1 mm or at least 5 mm or at least 10 mm or at least 25 mm or at least 50 mm or at least 100 mm or at least 200 mm or at least 500 mm. It will be appreciated that the third portion 212 may have an average thickness ($T_3$) within a range including any of the minimum and maximum values noted above.

In certain instances, the body 201 may be formed to have a particular thickness of the different portions relative to each other. For example, the body 201 can have a secondary thickness ratio, $2^{nd}$ $Tr=(T_1/T_3)$, wherein $T_1$ is the average thickness of the first portion 210 and $T_3$ is the average thickness of the third portion 212. The secondary thickness ratio can be at least 0.1 or at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10. In yet another embodiment, the secondary thickness ratio may be not greater than 10, such as not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3. It will be appreciated that the secondary thickness ratio may be within a range including any of the minimum and maximum values noted above. As noted herein, for those embodiments having portions that vary in the direction of the length, the secondary length ratio $2^{nd}$ $Lr=(L_1/L_3)$ can have any of the same values noted above for the secondary thickness ratio. Moreover, for those embodiments having portions that vary in the direction of the width, the secondary width ratio $2^{nd}$ $Wr=(W_1/W_3)$ can have any of the same values noted above for the secondary thickness ratio.

The body may further include a tertiary thickness ratio as defined by the relative thickness of the second portion to the third portion. For example, the body 201 can have a tertiary thickness ratio, $3^{rd}$ $Tr=(T_2/T_3)$, wherein $T_2$ is the average thickness of the second portion 211 and $T_3$ is the average thickness of the third portion 212, of at least 0.1. In another embodiment, the tertiary thickness ratio can be at least 0.2, such as or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10. In another non-limiting embodiment, the body 201 may have a tertiary thickness ratio of not greater than 10 or not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3. It will be appreciated that the tertiary thickness ratio can be within range including any of the minimum and maximum values noted above. As noted herein, for those embodiments having portions that vary in the direction of the length, the tertiary length ratio $3^{rd}$ $Lr=(L_2/L_3)$ can have any of the same values noted above for the tertiary thickness ratio. Moreover, for those embodiments having portions that vary in the direction of the width, the tertiary width ratio $3^{rd}$ $Wr=(W_2/W_3)$ can have any of the same values noted above for the tertiary thickness ratio.

In still other aspects, the body may have an average Shell Temperature of not greater than 400° C. The average Shell Temperature defines the heat conducted through the thickness of the body according to a Shell Temperature Test. In at least one embodiment, the body 201 may have an average Shell Temperature of not greater than 395° C., such as not greater than 390° C. or not greater than 385° C. or not greater than 380° C. or not greater than 375° C. or not greater than 370° C. or not greater than 365° C. or not greater than 360° C. or not greater than 355° C. or not greater than 350° C. or not greater than 345° C. or not greater than 340° C. or not greater than 335° C. or not greater than 330° C. or not greater than 325° C. Still, in one non-limiting embodiment, the body 201 may have an average Shell Temperature of at least 100° C. or at least 150° C. or at least 200° C. or at least 250° C. It will be appreciated that the body 201 may have an average Shell Temperature within a range including any of the minimum and maximum values noted above.

Figure 3:
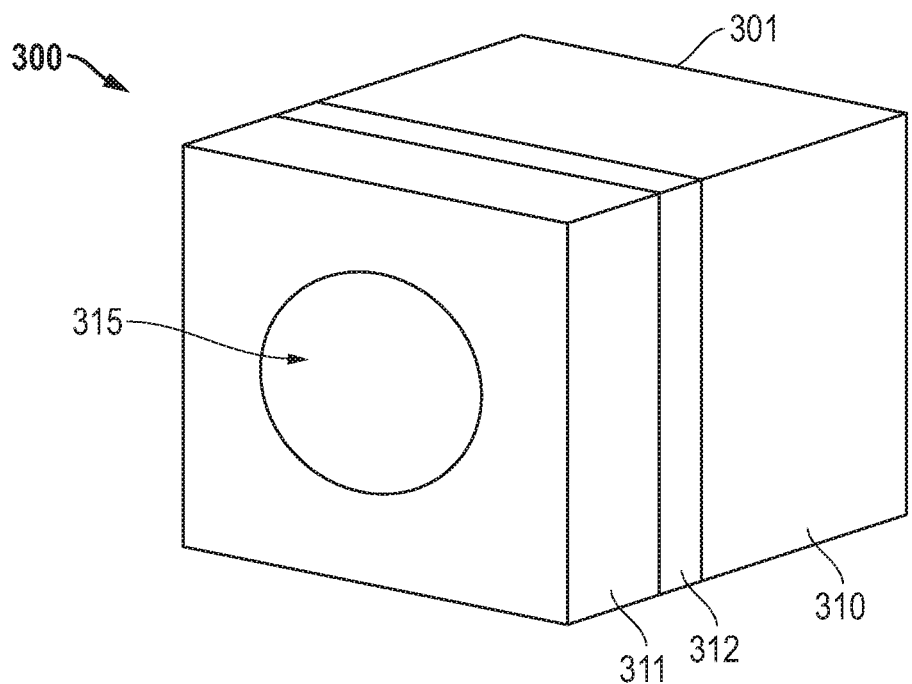
FIG. 3 includes a perspective view illustration of a refractory article according to an embodiment.

The embodiments of FIGS. 2A and 2B are not to be interpreted as limiting the shape, size, and/or relative dimensions of the body of the refractory articles. For example, FIG. 3 includes an illustration of an alternative embodiment. The refractory article 300 includes a body 301 including a first portion 310, a second portion 311, and a third portion 312 disposed between the first portion 310 and second portion 311. The body 301 may include an aperture 315 extending at least partially into the depth of the body 301 and in certain instances extending through the entire thickness (t) of the body 301.

Figure 4:
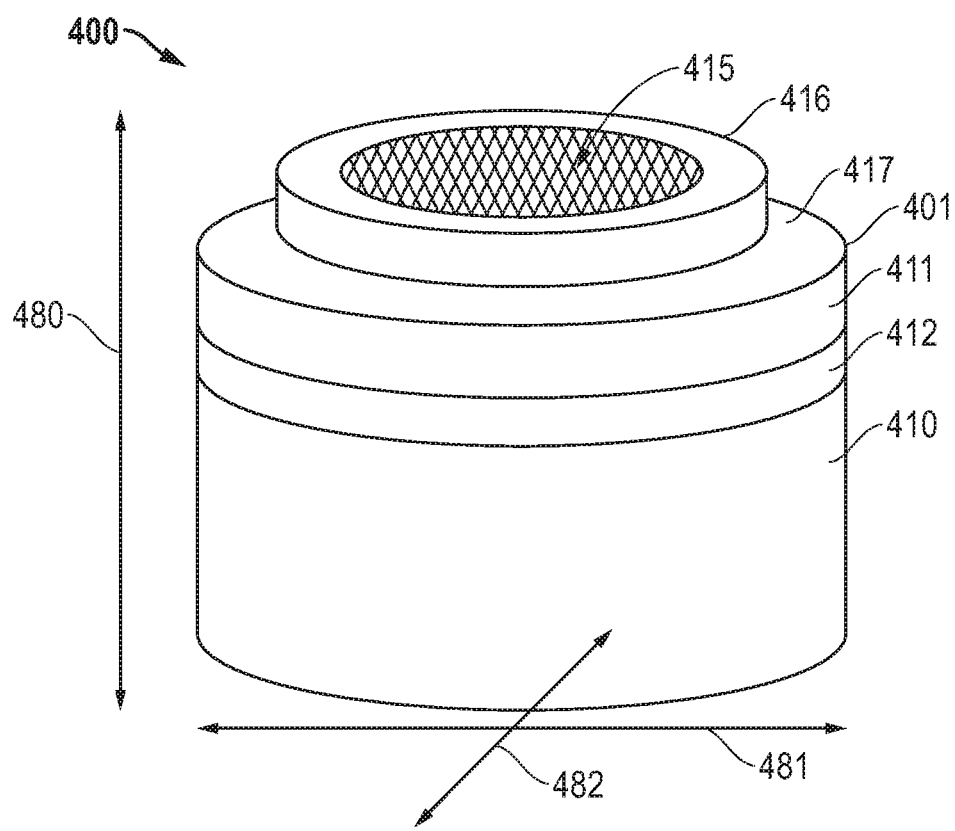
FIG. 4 includes a perspective view illustration of a refractory article according to an embodiment.

FIG. 4 includes a perspective view illustration of a refractory article having an alternative shape in accordance with an embodiment. For example, the article 400 can include a body 401 having a first portion 410, second portion 411, and third portion 412 disposed between the first portion 410 and the second portion 411. The body 401 may further include an exterior surface 417 and a lip 416 extending from the body 401, and particularly, the exterior surface 417. The lip 416 may be an annular lip extending through the entire circumference of the body 201. The body 401 may further include an aperture 415, which may be in the form of a central opening extending partially or entirely through the length L of the body.

Figure 5:
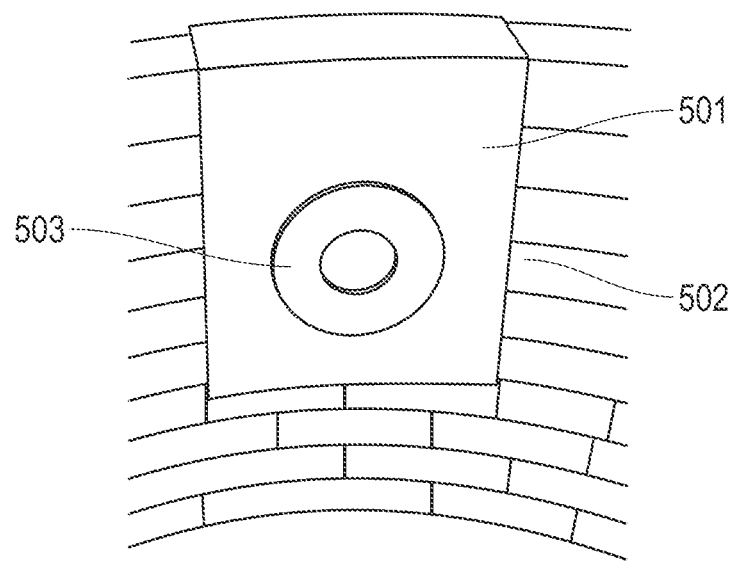
FIG. 5 includes an illustration of a furnace including a refractory article according to an embodiment.

The refractory articles of the embodiments herein can be utilized in high-temperature applications, such as a foundry or furnace. For example, in at least one embodiment the body of the refractory article can be part of the furnace wall. FIG. 5 includes an image of a portion of a furnace, including a burner block 501 as part of the furnace wall 502, and a refractory article 503 according to an embodiment. The refractory article 503 can have any of the features of the embodiments herein.

Figure 7:
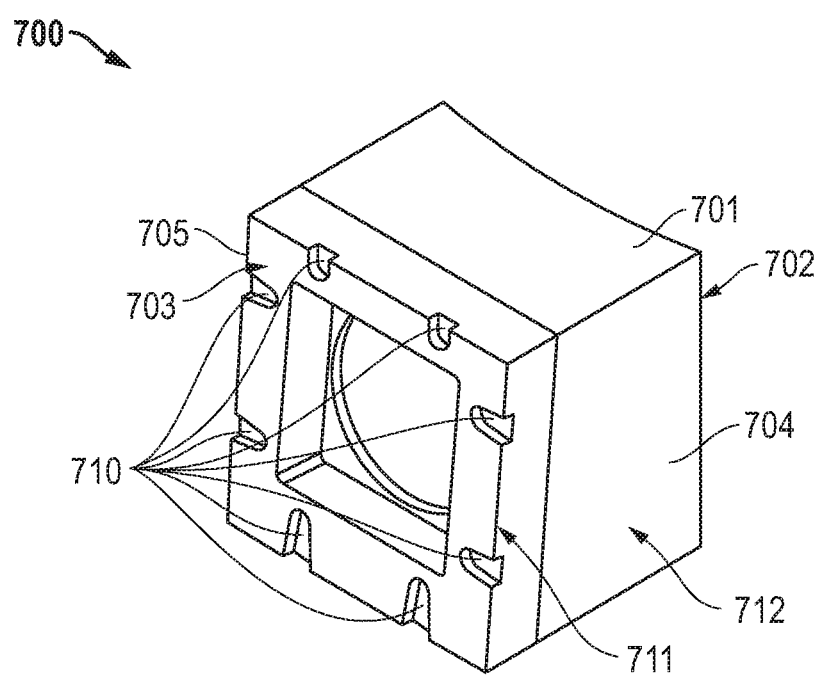
FIG. 7 includes a perspective view illustration of a refractory article according to an embodiment.

FIG. 7 includes a perspective view illustration of a refractory article according to another embodiment. As illustrated, the refractory article 700 can have a body 701. The body 701 of FIG. 7 is illustrated as having an approximately cubicle three-dimensional shape, however it will be appreciated that other sizes and shapes that the refractory article may be suitable depending upon the intended application. The body 701 can include a plurality of exterior surfaces, including a first exterior surface 702 and a second exterior surface 703. The body 701 of the refractory article 700 can have any one feature or combination of features of any of the refractory articles of the embodiments herein.

The body 701 can have a first portion 704 defining the first exterior surface 702 and a second portion 705 defining the second exterior surface 703. In one particular embodiment, the second exterior surface 703 includes at least one mounting element 710. In another embodiment, the second exterior surface 703 can include a plurality of mounting elements 710.

The at least one mounting element 710 is suitable for affixing the body 701 on the wall of a furnace. More particularly, the at least one mounting element 710 can be part of a complementary mounting assembly including the at least one mounting element 710 of the body 701 and a mounting element of a furnace wall (not depicted). In one embodiment, the at least one mounting element 710 includes at least one of a protrusion, a groove, a slot, a fixture, a fastener, or any combination thereof. In the illustrated embodiment of FIG. 7, the mounting elements 710 are shown as grooves extending into the body 701 of the second exterior surface 703. In certain instances, the at least one mounting element 710 is integral to the body, such as the grooves illustrated in FIG. 7. Still, in another embodiment, the at least one mounting element 710 can be a releasably secured component, such as a bracket, fixture, or fastener releasably secured to the second exterior surface 703 of the body 701.

The position of the at least one mounting element 710 on the body may eliminate the need for intermediate mounting components used in conventional refractory articles. The at least one mounting element 710 can be on the second exterior surface 703, and more particularly may be integral within the second exterior surface 703. In one particular embodiment, the plurality of mounting elements 710 can be spaced apart from each other on the second exterior surface 703. For example, as illustrated in FIG. 7, the plurality of mounting elements are spaced around a peripheral edge 711 joining the second exterior surface and an exterior side surface 712 of the body 701.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A refractory article comprising:
a body including:
a first portion defining at least a portion of a first exterior surface of the body, wherein the first portion comprises a carbide;
a second portion defining at least a portion of a second exterior surface of the body opposite the first exterior surface, wherein the second portion comprises an oxide;
a thermal conductivity difference ($\Delta TC$) of at least 10 W/mK between the first exterior surface and the second exterior surface; and
an average Shell Temperature of not greater than 400° C.

Embodiment 2

A refractory article comprising:
a body including:
a first portion defining at least a portion of a first exterior surface of the body, wherein the first portion comprises a carbide;
a second portion defining at least a portion of a second exterior surface of the body opposite the first exterior surface and having an average thickness of at least 5% of the total thickness of the body, wherein the second portion comprises an oxide; and
a thermal conductivity difference of at least 10 W/mK between the first exterior surface and the second exterior surface.

Embodiment 3

A refractory article comprising:
a body including:
a first portion defining at least a portion of a first exterior surface of the body, wherein the first portion comprises a carbide;
a second portion defining at least a portion of a second exterior surface of the body opposite the first exterior surface, wherein the second portion includes a majority content (vol %) of a polycrystalline oxide material; and
a thermal conductivity difference of at least 10 W/mK at 300 K between the first exterior surface and the second exterior surface.

Embodiment 4

The refractory article of any one of embodiments 1, 2, and 3, wherein the first portion comprises silicon carbide.

Embodiment 5

The refractory article of any one of embodiments 1, 2, and 3, wherein the first portion comprises at least one material from the group of oxygen, nitrogen, compounds thereof, or any combination thereof.

Embodiment 6

The refractory article of any one of embodiments 1, 2, and 3, wherein the first portion comprises a primary phase including silicon carbide and a secondary phase comprising a nitrogen-containing composition.

Embodiment 7

The refractory article of embodiment 6, wherein the first portion has a content ratio $Cr1=(SC2/PC1)$ of at least 0.1, wherein PC1 is the content (vol %) of the primary phase and SC2 is the content (vol %) of the secondary phase, wherein the content ratio of the first portion (Cr1) can be at least 0.001 or at least 0.01 or at least 0.1 or at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10.

Embodiment 8

The refractory article of embodiment 6, the first portion has a content ratio Cr1=(SC2/PC1) of not greater than 1000, wherein PC1 is the content (vol %) of the primary phase and SC2 is the content (vol %) of the secondary phase, wherein the content ratio of the first portion (Cr1) can be not greater than 100 or not greater than 10 or not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3.

Embodiment 9

The refractory article of any one of embodiments 1, 2, and 3, wherein the first portion comprises nitride-bonded silicon carbide.

Embodiment 10

The refractory article of any one of embodiments 1, 2, and 3, wherein the first portion consists essentially of nitride-bonded silicon carbide.

Embodiment 11

The refractory article of any one of embodiments 1, 2, and 3, wherein the first portion comprises oxynitride-bonded silicon carbide.

Embodiment 12

The refractory article of any one of embodiments 1, 2, and 3, wherein the first portion consists essentially of oxynitride-bonded silicon carbide.

Embodiment 13

The refractory article of any one of embodiments 1, 2, and 3, wherein the first portion consists essentially of silicon carbide.

Embodiment 14

The refractory article of any one of embodiments 1, 2, and 3, wherein the first portion comprises an average thermal conductivity of at least 10 W/mK or at least 11 W/mK or at least 12 W/mK or at least 13 W/mK or at least 14 W/mK or at least 15 W/mK or at least 16 W/mK or at least 17 W/mK or at least 18 W/mK or at least 20 W/mK or at least 25 W/mK or at least 30 W/mK or at least 35 W/mK or at least 40 W/mK or at least 45 W/mK or at least 50 W/mK or at least 55 W/mK or at least 60 W/mK or at least 65 W/mK or at least 70 W/mK or at least 80 W/mK or at least 90 W/mK or at least 100 W/mK.

Embodiment 15

The refractory article of any one of embodiments 1, 2, and 3, wherein the first portion comprise an average thermal conductivity of not greater than 200 W/mK or not greater than 180 W/mK or not greater than 160 W/mK or not greater than 140 W/mK or not greater than 120 W/mK or not greater than 100 W/mK or not greater than 90 W/mK or not greater than 80 W/mK or not greater than 70 W/mK or not greater than 60 W/mK or not greater than 50 W/mK or not greater than 45 W/mK or not greater than 40 W/mK or not greater than 35 W/mK or not greater than 30 W/mK or not greater than 25 W/mK or not greater than 22 W/mK or not greater than 20 W/mK.

Embodiment 16

The refractory article of any one of embodiments 1, 2, and 3, wherein the first portion comprises a primary phase comprising silicon carbide having an average crystallite size within a range of at least 1 micron to not greater than 10 mm.

Embodiment 17

The refractory article of any one of embodiments 1 and 3, wherein the first portion comprises an average thickness of at least 5% of the total thickness of the body.

Embodiment 18

The refractory article of any one of embodiments 2 and 17, wherein the first portion comprises an average thickness of at least 10% of a total thickness of the body or at least 20% or at least 30% or at least 40% or at least 50% or at least 60% or at least 70% or at least 80% of a total thickness of the body.

Embodiment 19

The refractory article of any one of embodiments 1, 2, and 3, wherein the first portion comprises an average thickness of not greater than 90% of a total thickness of the body or not greater than 80% or not greater than 70% or not greater than 60% or not greater than 50% or not greater than 40% or not greater than 30% or not greater than 20% of a total thickness of the body.

Embodiment 20

The refractory article of any one of embodiments 1, 2, and 3, wherein the first portion comprises an average thickness of at least 1 mm or at least 5 mm or at least 10 mm or at least 25 mm or at least 50 mm or at least 100 mm or at least 200 mm or at least 500 mm.

Embodiment 21

The refractory article of any one of embodiments 1, 2, and 3, wherein the first portion comprises an average thickness of not greater than 10 m or not greater than 5 m or not greater than 3 m or not greater than 1 m or not greater than 800 mm or not greater than 500 mm or not greater than 200 mm or not greater than 100 mm.

Embodiment 22

The refractory article of any one of embodiments 1, 2, and 3, wherein the first portion defines not greater than 90% of a total exterior surface area of the body or not greater than 80% or not greater than 70% or not greater than 60% or not greater than 50% or not greater than 40% or not greater than 30% or not greater than 20% or not greater than 10%.

Embodiment 23

The refractory article of any one of embodiments 1, 2, and 3, wherein the first portion defines at least 1% of a total exterior surface area of the body or at least 5% or at least 10% or at least 20% or at least 30% or at least 40% or at least 50% or at least 60% or at least 70% or at least 80%.

Embodiment 24

The refractory article of any one of embodiments 1, 2, and 3, wherein the second portion comprises alumina and silica.

Embodiment 25

The refractory article of any one of embodiments 1, 2, and 3, wherein the second portion comprises an aluminosilicate.

Embodiment 26

The refractory article of any one of embodiments 1, 2, and 3, wherein the second portion comprises mullite ($3Al_2O_3$-$2SiO_2$ or $2Al_2O_3$—$SiO_2$).

Embodiment 27

The refractory article of any one of embodiments 1, 2, and 3, wherein the second portion consists essentially of mullite ($3Al_2O_3$-$2SiO_2$ or $2Al_2O_3$—$SiO_2$).

Embodiment 28

The refractory article of any one of embodiments 1 and 2, wherein the second portion includes a majority content (vol %) of a polycrystalline oxide material.

Embodiment 29

The refractory article of any one of embodiments 3 and 28, wherein the second portion includes at least 60 vol % of a polycrystalline oxide material for a total volume of the second portion or at least 70 vol % or at least 80 vol % or at least 90 vol % or at least 95 vol % of a polycrystalline oxide material for a total volume of the second portion.

Embodiment 30

The refractory article of any one of embodiments 3 and 28, wherein the second portion consists essentially of polycrystalline oxide material.

Embodiment 31

The refractory article of any one of embodiments 3 and 28, wherein the second portion includes at least 60 vol % of a polycrystalline mullite for a total volume of the second portion or at least 70 vol % or at least 80 vol % or at least 90 vol % or at least 95 vol % of a polycrystalline mullite for a total volume of the second portion.

Embodiment 32

The refractory article of any one of embodiments 3 and 28, wherein the second portion consists essentially of polycrystalline mullite.

Embodiment 33

The refractory article of any one of embodiments 1, 2, and 3, wherein the second portion is essentially free of an amorphous phase material.

Embodiment 34

The refractory article of any one of embodiments 1, 2, and 3, wherein the second portion comprises an average thermal conductivity of not greater than 10 W/mK or not greater than 8 W/mK or not greater than 7 W/mK or not greater than 6 W/mK or not greater than 5 W/mK or not greater than 4 W/mK or not greater than 2 W/mK or not greater than 1 W/mK.

Embodiment 35

The refractory article of any one of embodiments 1, 2, and 3, wherein the second portion comprises an average thermal conductivity of at least 0.5 W/mK or at least 1 W/mK or at least 2 W/mK or at least 3 W/mK or at least 4 W/mK or at least 5 W/mK or at least 6 W/mK or at least 7 W/mK or at least 8 W/mK.

Embodiment 36

The refractory article of any one of embodiments 1, 2, and 3, further comprising a thermal conductivity difference $\Delta TC=TC1-TC2$ of not greater than 200 W/mK, wherein TC1 is the average thermal conductivity of the first portion and TC2 is the average thermal conductivity of the second portion, wherein the thermal conductivity difference $\Delta TC$ is not greater than 180 W/mK or not greater than 160 W/mK or not greater than 140 W/mK or not greater than 120 W/mK or not greater than 100 W/mK or not greater than 90 W/mK or not greater than 80 W/mK or not greater than 70 W/mK or not greater than 60 W/mK or not greater than 50 W/mK or not greater than 45 W/mK or not greater than 40 W/mK or not greater than 35 W/mK or not greater than 30 W/mK or not greater than 25 W/mK or not greater than 22 W/mK or not greater than 20 W/mK.

Embodiment 37

The refractory article of any one of embodiments 1, 2, and 3, further comprising a thermal conductivity difference $\Delta TC=TC1-TC2$ of at least 12 W/mK, wherein TC1 is the average thermal conductivity of the first portion and TC2 is the average thermal conductivity of the second portion, wherein the thermal conductivity difference $\Delta TC$ is at least 13 W/mK or at least 14 W/mK or at least 15 W/mK or at least 16 W/mK or at least 17 W/mK or at least 18 W/mK or at least 20 W/mK or at least 25 W/mK or at least 30 W/mK or at least 35 W/mK or at least 40 W/mK or at least 45 W/mK or at least 50 W/mK or at least 55 W/mK or at least 60 W/mK or at least 70 W/mK or at least 80 W/mK or at least 90 W/mK or at least 100 W/mK.

Embodiment 38

The refractory article of any one of embodiments 1, 2, and 3, further comprising a coefficient of thermal expansion difference ($\Delta CTE=CTE1-CTE2$) of not greater than 5 $10^{-6}/°$ C., wherein CTE1 is the average coefficient of thermal expansion of the first portion and CTE2 is the average coefficient of thermal expansion of the second portion or not greater than $4.8\times10^{-6}/°$ C. or not greater than $4.6\times10^{-6}/°$ C. or not greater than $4.4\times10^{-6}/°$ C. or not greater than $4.2\times10^{-6}/°$ C. or not greater than $4\times10^{-6}/°$ C. or not greater than $3.8\times10^{-6}/°$ C. or not greater than $3.6\times10^{-6}/°$ C. or not greater than $3.4\times10^{-6}/°$ C. or not greater than $3.2\times10^{-6}/°$ C. or not greater than $3\times10^{-6}/°$ C. or not greater than $2.9\times10^{-6}/°$ C. or not greater than $2.8\times10^{-6}/°$ C. or not greater than $2.7\times10^{-6}/°$ C. or not greater than $2.6\times10^{-6}/°$ C. or not greater than $2.5\times10^{-6}/°$ C. or not greater than $2.4\times10^{-6}/°$ C. or not greater than $2.3\times10^{-6}/°$ C. or not greater than $2.2\times10^{-6}/°$ C. or not greater than $2.1\times10^{-6}/°$ C. or not greater than $2\times10^{-6}/°$ C. or not greater than $1.9\times10^{-6}/°$ C. or not greater than $1.8\times10^{-6}/°$ C. or not greater than $1.7\times10^{-6}/°$ C. or not greater than $1.6\times10^{-6}/°$ C. or not greater than $1.5\times10^{-6}/°$ C. or not greater than $1.4\times10^{-6}/°$ C. or not greater than $1.3\times10^{-6}/°$ C. or not greater than $1.2\times10^{-6}/°$ C. or not greater than $1.1\times10^{-6}/°$ C. or not greater than $1\times10^{-6}/°$ C. or not greater than $0.9\times10^{-6}/°$ C. or not greater than $0.8\times10^{-6}/°$ C. or not greater than $0.7\times10^{-6}/°$ C. or not greater than $0.6\times10^{-6}/°$ C. or not greater than $0.5\times10^{-6}/°$ C. or not greater than $0.4\times10^{-6}/°$ C. or not greater than $0.3\times10^{-6}/°$ C. or not greater than $0.2\times10^{-6}/°$ C. or not greater than $0.1\times10^{-6}/°$ C.

Embodiment 39

The refractory article of any one of embodiments 1, 2, and 3, wherein the second portion comprises a polycrystalline phase having an average crystallite size within a range of at least 1 micron to not greater than 10 mm.

Embodiment 40

The refractory article of any one of embodiments 1 and 3, wherein the second portion comprises an average thickness of at least 5% of a total thickness of the body.

Embodiment 41

The refractory article of any one of embodiments 2 and 40, wherein the second portion comprises an average thickness of at least 6% of a total thickness of the body or at least 7% or at least 8% or at least 9% or at least 10% or at least 15% or at least 20% or at least 25% or at least 30% or at least 35% or at least 40% or at least 50% or at least 55% or at least 60% of a total thickness of the body.

Embodiment 42

The refractory article of any one of embodiments 1, 2, and 3, wherein the second portion comprises an average thickness of not greater than 90% of a total thickness of the body or not greater than 80% or not greater than 70% or not greater than 60% or not greater than 50% or not greater than 40% or not greater than 30% or not greater than 20% or not greater than 10% of a total thickness of the body.

Embodiment 43

The refractory article of any one of embodiments 1, 2, and 3, wherein the first portion comprises a first average thickness (T1) and the second portion comprises a second average thickness (T2), and wherein the body comprises a thickness ratio $Tr=(T1/T2)$ that is at least 0.1 or at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10.

Embodiment 44

The refractory article of any one of embodiments 1, 2, and 3, wherein the first portion comprises a first average thickness (T1) and the second portion comprises a second average thickness (T2) and wherein the body comprises a thickness ratio $Tr=(T1/T2)$ that is not greater than 10 or not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3.

Embodiment 45

The refractory article of any one of embodiments 1 and 3, wherein the second portion comprises an average thickness of at least 1 mm.

Embodiment 46

The refractory article of any one of embodiments 2 and 45, wherein the second portion comprises an average thickness of at least 5 mm or at least 10 mm or at least 25 mm or at least 50 mm or at least 100 mm or at least 200 mm or at least 500 mm.

Embodiment 47

The refractory article of any one of embodiments 2 and 45, wherein the second portion comprises an average thickness of not greater 3 m or not greater than 2 m or not greater than 1 m or not greater than 800 mm or not greater than 500 mm or not greater than 200 mm or not greater than 100 mm.

Embodiment 48

The refractory article of any one of embodiments 1, 2, and 3, wherein the second portion defines not greater than 90% of a total exterior surface area of the body or not greater than 80% or not greater than 70% or not greater than 60% or not greater than 50% or not greater than 40% or not greater than 30% or not greater than 20% or not greater than 10%.

Embodiment 49

The refractory article of any one of embodiments 1, 2, and 3, wherein the second portion defines at least 1% of a total exterior surface area of the body or at least 5% or at least 10% or at least 20% or at least 30% or at least 40% or at least 50% or at least 60% or at least 70% or at least 80%.

Embodiment 50

The refractory article of any one of embodiments 1, 2, and 3, further comprising a third portion disposed between the first portion and the second portion.

Embodiment 51

The refractory article of embodiment 50, wherein the third portion comprises at least one of an oxide and a carbide.

Embodiment 52

The refractory article of embodiment 50, wherein the third portion comprises an oxide and a carbide.

Embodiment 53

The refractory article of embodiment 50, wherein the third portion comprises at least a first phase comprising a material selected from the group of silicon carbide (SiC), silicon nitride ($Si_3N_4$), silicon oxynitride ($Si_2ON_2$), silica ($SiO_2$), mullite ($3Al_2O_3$-$2SiO_2$ or $2Al_2O_3$—$SiO_2$), alumina, ($Al_2O_3$), silicon aluminum oxynitride (SiAlON), or any combination thereof.

Embodiment 54

The refractory article of embodiment 50, wherein the third portion comprises a first phase comprising nitride-bonded silicon carbide and a second phase comprising mullite ($3Al_2O_3$-$2SiO_2$ or $2Al_2O_3$—$SiO_2$).

Embodiment 55

The refractory article of embodiment 50, wherein the third portion comprises a first phase in a first content (C1) (vol %) and a second phase in a second content (C2) (vol %) and wherein the third phase comprises a content ratio Cr=(C1/C2) of at least 0.1 or at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10.

Embodiment 56

The refractory article of embodiment 50, wherein the third portion comprises a first phase in a first content (C1) (vol %) and a second phase in a second content (C2) (vol %) and wherein the third phase comprises a content ratio Cr=(C1/C2) of not greater than 10 or not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3.

Embodiment 57

The refractory article of embodiment 50, wherein the third portion comprise an average thermal conductivity of not greater than 50 W/mK or not greater than 45 W/mK or not greater than 40 W/mK or not greater than 30 W/mK or not greater than 25 W/mK or not greater than 20 W/mK or not greater than 18 W/mK or not greater than 15 W/mK.

Embodiment 58

The refractory article of embodiment 50, wherein the third portion comprises an average thermal conductivity of at least 1 W/mK or at least 2 W/mK or at least 3 W/mK or at least 4 W/mK or at least 5 W/mK or at least 6 W/mK or at least 7 W/mK or at least 8 W/mK or at least 10 W/mK or at least 12 W/mK or at least 14 W/mK or at least 16 W/mK or at least 18 W/mK or at least 20 W/mK or at least 25 W/mK.

Embodiment 59

The refractory article of embodiment 50, wherein the third portion comprises a first phase comprising silicon carbide having an average crystallite size within a range of at least 1 micron to not greater than 10 mm.

Embodiment 60

The refractory article of embodiment 50, wherein the third portion comprises a second phase comprising an oxide having an average crystallite size within a range of at least 1 micron to not greater than 10 mm.

Embodiment 61

The refractory article of embodiment 50, wherein the third portion comprises an average thickness of at least 1% of a total thickness of the body or at least 5% or at least 10% or at least 20% or at least 30% or at least 40% or at least 50% of a total thickness of the body.

Embodiment 62

The refractory article of embodiment 50, wherein the third portion comprises an average thickness of not greater than 90% of a total thickness of the body or not greater than 80% or not greater than 70% or not greater than 60% or not greater than 50% or not greater than 40% or not greater than 30% or not greater than 20% or not greater than 10% or not greater than 5% of a total thickness of the body.

Embodiment 63

The refractory article of embodiment 50, wherein the third portion comprises an average thickness of not greater than 1 m or not greater than 800 mm or not greater than 500 mm or not greater than 200 mm or not greater than 100 mm or not greater than 50 mm or not greater than 20 mm or not greater than 10 mm or not greater than 1 mm or not greater than 500 microns or not greater than 100 microns.

Embodiment 64

The refractory article of embodiment 50, wherein the third portion comprises an average thickness of at least 1 micron or at least 10 microns or at least 20 microns or at least 30 microns or at least 50 microns or at least 100 microns or at least 200 microns or at least 500 microns or at least 1 mm or at least 5 mm or at least 10 mm or at least 25 mm or at least 50 mm or at least 100 mm or at least 200 mm or at least 500 mm.

Embodiment 65

The refractory article of embodiment 50, wherein the first portion comprises a first average thickness (T1) and the third portion comprises a third average thickness (T3), and wherein the body comprises a secondary thickness ratio $2^{nd}$ Tr=(T1/T3) of at least 0.1 or at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10.

Embodiment 66

The refractory article of embodiment 50, wherein the first portion comprises a first average thickness (T1) and the third portion comprises a third average thickness (T3), and wherein the body comprises a secondary thickness ratio $2^{nd}$ Tr=(T1/T3) of not greater than 10 or not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3.

Embodiment 67

The refractory article of embodiment 50, wherein the second portion comprises a second average thickness (T2) and the third portion comprises a third average thickness (T3), and wherein the body comprises a tertiary thickness ratio $3^{rd}$ Tr=(T2/T3) of at least 0.1 or at least 0.2 or at least 0.3 or at least 0.4 or at least 0.5 or at least 0.6 or at least 0.7 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.2 or at least 2.5 or at least 2.7 or at least 3 or at least 3.2 or at least 3.5 or at least 4 or at least 5 or at least 6 or at least 7 or at least 8 or at least 9 or at least 10.

Embodiment 68

The refractory article of embodiment 50, wherein the second portion comprises a second average thickness (T2) and the third portion comprises a third average thickness (T3), and wherein the body comprises a tertiary thickness ratio $3^{rd}$ Tr=(T2/T3) of not greater than 10 or not greater than 9 or not greater than 8 or not greater than 7 or not greater than 6 or not greater than 5 or not greater than 4 or not greater than 3 or not greater than 2.5 or not greater than 2 or not greater than 1.8 or not greater than 1.5 or not greater than 1.2 or not greater than 1 or not greater than 0.9 or not greater than 0.8 or not greater than 0.7 or not greater than 0.6 or not greater than 0.5 or not greater than 0.4 or not greater than 0.3.

Embodiment 69

The refractory article of any one of embodiments 2 and 3, wherein the body comprises an average Shell Temperature of not greater than 400° C.

Embodiment 70

The refractory article of any one of embodiments 1 and 69, wherein the body comprises an average Shell Temperature of not greater than 395° C. or not greater than 390° C. or not greater than 385° C. or not greater than 380° C. or not greater than 375° C. or not greater than 370° C. or not greater than 365° C. or not greater than 360° C. or not greater than 355° C. or not greater than 350° C. or not greater than 345° C. or not greater than 340° C. or not greater than 335° C. or not greater than 330° C. or not greater than 325° C.

Embodiment 71

The refractory article of any one of embodiments 1 and 69, wherein the body comprises an average Shell Temperature of at least 100° C. or at least 150° C. or at least 200° C. or at least 250° C.

Embodiment 72

The refractory article of any one of embodiments 1, 2, and 3, wherein the body is part of a furnace wall.

Embodiment 73

The refractory article of any one of embodiments 1, 2, and 3, wherein the body further comprises a central opening extending through the body.

Embodiment 74

The refractory article of any one of embodiments 1, 2, and 3, wherein the body further comprises an annular lip extending from a major surface of the body.

Embodiment 75

A furnace including the refractory article of any one of embodiments 1, 2, and 3.

Embodiment 76

A system comprising:
a furnace including a furnace wall defining a volume for heating material, wherein the furnace wall comprises at least one at least one refractory comprising:
a body including:
a first portion defining at least a portion of a first exterior surface of the body, wherein the first portion comprises a carbide;
a second portion defining at least a portion of a second exterior surface of the body opposite the first exterior surface, wherein the second portion comprises an oxide;
a thermal conductivity difference of at least 10 W/mK between the first exterior surface and the second exterior surface; and
an average Shell Temperature of not greater than 400° C.

Embodiment 77

A method of forming a refractory article comprising:
placing a first material into a production tool;
placing a second material into the production tool;

forming a green body having a first portion including the first material and a second portion including the second material; and forming a refractory article from the green body, wherein the refractory body comprises:

a first portion defining at least a portion of a first exterior surface of the body, wherein the first portion comprises a carbide;

a second portion defining at least a portion of a second exterior surface of the body opposite the first exterior surface, wherein the second portion comprises an oxide.

Embodiment 78

The method of embodiment 77, wherein placing the first material into a production tool includes depositing the first material into a cavity in the production tool, and wherein placing the second material into the production tool includes depositing the second material onto the first material into the cavity of the production tool.

Embodiment 79

The method of embodiment 77, wherein the first material is a dry powder mixture.

Embodiment 80

The method of embodiment 77, wherein the first material is a wet mixture including a particulate material contained in a liquid carrier.

Embodiment 81

The method of embodiment 77, wherein the second material is a dry powder mixture.

Embodiment 82

The method of embodiment 77, wherein the second material is a wet mixture including a particulate material contained in a liquid carrier.

Embodiment 83

The method of embodiment 77, wherein the first material includes at least one material selected from the group of silicon carbide (SiC), silicon metal (Si), silica ($SiO_2$), silicon nitride ($Si_3N_4$), or any combination thereof.

Embodiment 84

The method of embodiment 77, wherein the second material includes an oxide.

Embodiment 85

The method of embodiment 77, wherein the second material includes alumina.

Embodiment 86

The method of embodiment 77, wherein the second material includes silica.

Embodiment 87

The method of embodiment 77, wherein the second material includes an aluminosilicate.

Embodiment 88

The method of embodiment 77, wherein the process further includes placing a third material into the production tool, wherein the third material is disposed between the first material and the second material.

Embodiment 89

The method of embodiment 88, wherein the third material is a dry powder mixture.

Embodiment 90

The method of embodiment 88, wherein the third material is a wet mixture including a particulate material contained in a liquid carrier.

Embodiment 91

The method of embodiment 88, wherein the third material includes a mixture of the first material and the second material.

Embodiment 92

The method of embodiment 77, wherein forming the green body includes at least one process selected from the group consisting of molding, casting, pressing, drying, cooling, heating, irradiating, additive manufacturing, or any combination thereof.

Embodiment 93

The method of embodiment 88, wherein forming the green body and the refractory article is completed in single forming process in a single processing vessel.

Embodiment 94

The method of embodiment 77, wherein forming the refractory article includes firing the green body at a firing temperature within a range of at least 1200° C. to not greater than 2000° C.

Embodiment 95

The method of embodiment 77, wherein forming the refractory article includes firing the green body in at least one atmospheric condition from the group of inert, oxidizing, reducing, or nitrogen-rich, or any combination thereof.

Embodiment 96

The method of embodiment 77, wherein forming the refractory article includes co-firing the first portion and second portion.

Embodiment 97

The method of embodiment 77, wherein forming the refractory article includes forming a diffusion region between the first portion and the second portion defined by the inter diffusion of species from the first and second portions during sintering, wherein the diffusion region defines a third portion of the body.

Embodiment 98

The refractory article of any one of embodiments 1, 2, and 3, wherein the second exterior surface comprises at least one mounting element.

Embodiment 99

The refractory article of embodiment 98, wherein the at least one mounting element includes at least one of a protrusion, a groove, a slot, a fixture, a fastener, or any combination thereof.

Embodiment 100

The refractory article of embodiment 98, wherein the at least one mounting element is integral to the body.

Embodiment 101

The refractory article of embodiment 98, wherein the at least one mounting element is one part of a complementary mounting assembly including the at least one mounting element of the body and a mounting element of a furnace wall.

Embodiment 102

The refractory article of embodiment 98, wherein the body comprises a plurality of mounting elements spaced apart from each other on the second exterior surface.

Embodiment 103

The refractory article of embodiment 102, wherein the plurality of mounting elements are spaced around a peripheral edge joining the second exterior surface and an exterior side surface of the body.

EXAMPLES

Example 1

A first powder mixture was made with the following proportion of dry powder ingredients: 84.2% black silicon carbide; 0.5% boron carbide; 9.0% silicon metal; 6.0% silica fume; 0.2% limestone. The black silicon carbide powder is available from Saint Gobain Corporation. At least about 90% of the black silicon carbide powder particles have a size in the range about 50 microns to about 5 mm.

An organic binder solution of methylcellulose in water was added to the first powder mixture while mixing in a high intensity mixer until a substantially uniform mass was obtained. The amount of organic binder solution added was sufficient to cause the mixture to be moldable. The binder is temporary, as it is partially or completely eliminated during drying and firing steps.

The mixed first material was then placed in the cavity of a mold and compacted under pressurized ram.

A second material, having mullite powder as the major component, was obtained from Washington Mills. The second powder and has an average particle size around 0.38 mm. Alumina and clay powders are added to the mix to give a final composition of 79% alumina and 20% silica. An organic binder mixture and water were added to the powders while mixing in a high intensity mixer until a substantially uniform mass was obtained.

A third material was formed and included a mixture of the first material and second material in a ratio of 1:1 (i.e., 50 wt % of the first material and 50 wt % of the second material).

The third material was deposited into the mold cavity on the first material and compacted in the same manner as the first material. The second material was deposited into the cavity of the mold onto the third material and compacted in the same manner as the first and third materials. The result was a green body including a combination of the first material, second material, and third material disposed between the first material and the second material. The green body was removed from the mold and dried at 93° C. to remove water before firing.

The dried green body was then fired in a kiln. Firing was carried out in a nitrogen atmosphere (>99% nitrogen) with peak temperature of 1430° C. After conducting a sufficient firing in the nitrogen atmosphere, the atmosphere is changed to an oxidizing atmosphere.

Figure 6:
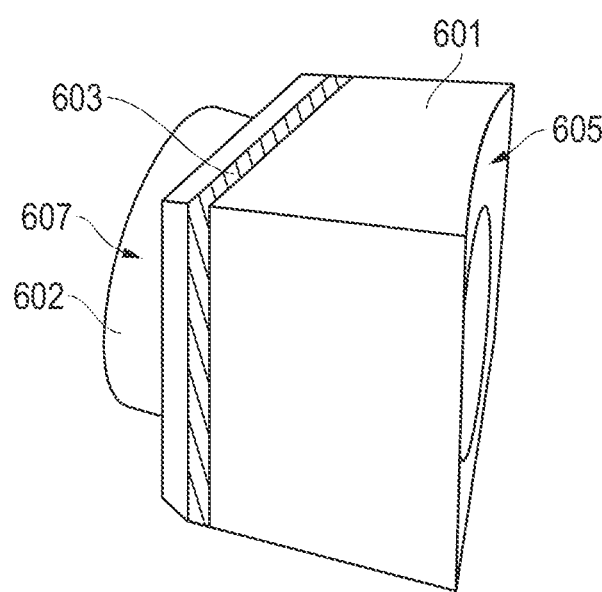
FIG. 6 includes an illustration of an image of a refractory article according to Example 1.

FIG. 6 includes a perspective view image of the refractory article of Example 1. The refractory article includes a first portion 601 consisting of silicon oxynitride-bonded silicon carbide including 18 wt % silicon oxynitride and 80 wt % silicon carbide. The total average thickness of the body is approximately 28.5 cm and the average thickness of the first portion 601 is approximately 16 cm. The first portion 601 has a thermal conductivity of approximately 19.2 W/mK at 1200° C. and a coefficient of thermal expansion of approximately $5\times10^{-6}/°$ C. up to 1500° C. The first phase of silicon carbide includes crystallites having an average grain size of approximately 0.23 mm.

The second portion 602 consists predominantly of mullite. The average thickness of the second portion 602 is approximately 11 cm. The second portion 602 has a thermal conductivity of approximately 1.73 W/mK at 1200° C. and a coefficient of thermal expansion of approximately $4.6\times10^{-6}/°$ C. up to 1500° C. The mullite includes crystallites having an average grain size of approximately 0.38 mm. The exterior surface 607 was made entirely of the second portion 602.

The third portion 603 consists of a mixture of oxynitride bonded silicon carbide and mullite in a 1:1 relative content. The average thickness of the third portion 603 is approximately 1.3 cm. The third portion 603 had a coefficient of thermal expansion of approximately $4.8\times10^{-6}/°$ C. The mullite includes crystallites having an average grain size of approximately 0.38 mm. The silicon carbide phase includes crystallites having an average grain size of approximately 0.23 mm. The third portion 603 is disposed between and abutting the first portion 601 and second portion 602. The third portion 603 is spaced apart from the exterior surfaces 605 and 607.

The present embodiments represent a departure from the state of the art. The tests on the refractory articles of embodiments herein reveal remarkable and unexpected performance by utilization of one or more of the features of the embodiments herein. Notably, without wishing to be tied to a particular theory, it is noted that certain features of the refractory articles of the embodiments herein facilitate improved combination of thermal properties (e.g., thermal shock resistance, thermal conductivity, etc.) and mechanical properties (e.g., dimensional stability as demonstrated by limited growth and warpage) compared to conventional refractory articles.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A refractory article comprising:
a body including:
a first portion defining at least a portion of a first exterior surface of the body, wherein the first portion comprises a carbide, wherein the first portion comprises a primary phase including silicon carbide and a secondary phase comprising a nitrogen-containing composition, and wherein the primary phase is present in a greater content than the secondary phase;
a second portion defining at least a portion of a second exterior surface of the body opposite the first exterior surface, wherein the second portion consists essentially of an oxide; and
a thermal conductivity difference ($\Delta TC$) of at least 10 W/mK at 1200° C. between the first exterior surface and the second exterior surface.

2. The refractory article of claim 1, wherein the second portion consists essentially of aluminosilicate.

3. The refractory article of claim 1, wherein the first portion comprises oxynitride-bonded silicon carbide or nitride-bonded silicon carbide.

4. The refractory article of claim 1, wherein the oxide comprises aluminosilicate.

5. The refractory article of claim 1, wherein the first portion comprises an average thermal conductivity of at least 10 W/mK and not greater than 200 W/mK.

6. The refractory article of claim 1, wherein the second portion comprises an average thermal conductivity of not greater than 10 W/mK.

7. The refractory article of claim 1, wherein the first portion consists essentially of nitride-bonded silicon carbide.

8. The refractory article of claim 1, wherein the first portion consists essentially of oxynitride-bonded silicon carbide.

9. A refractory article comprising:
a body including:
a first portion defining at least a portion of a first exterior surface of the body, wherein the first portion comprises a carbide;
a second portion defining at least a portion of a second exterior surface of the body opposite the first exterior surface and having an average thickness of at least 5% of the total thickness of the body, wherein the second portion comprises an oxide; and
a thermal conductivity difference of at least 10 W/mK at 1200° C. between the first exterior surface and the second exterior surface,
wherein the first portion comprises a primary phase including silicon carbide and a secondary phase comprising a nitrogen-containing composition, and wherein the primary phase is present in a greater content in the first portion than the secondary phase.

10. The refractory article of claim 9, wherein the first portion has a content ratio Cr1=(SC2/PC1) of at least 0.1, wherein PC1 is the content (vol%) of the primary phase and SC2 is the content (vol%) of the secondary phase.

11. The refractory article of claim 9, wherein the second portion comprises an aluminosilicate.

12. The refractory article of claim 9, wherein the second portion comprises mullite ($3Al_2O_3$-$2SiO_2$ or $2Al_2O_3$-$SiO_2$).

13. The refractory article of claim 9, further comprising a coefficient of thermal expansion difference ($\Delta CTE = CTE1 - CTE2$) of not greater than $5 \times 10^{-6}$/° C., wherein CTE1 is the average coefficient of thermal expansion of the first portion and CTE2 is the average coefficient of thermal expansion of the second portion.

14. The refractory article of claim 9, further comprising a third portion disposed between the first portion and the second portion.

15. The refractory article of claim 14, wherein the third portion comprises at least one of an oxide and a carbide.

16. The refractory article of claim 14, wherein the third portion comprises aluminosilicate and silicon carbide.

\* \* \* \* \*